United States Patent [19]

Pruitt

[11] Patent Number: 4,676,053
[45] Date of Patent: Jun. 30, 1987

[54] QUICK ADJUST FLOTATION APPARATUS FOR A CROP HARVESTER

[75] Inventor: Martin E. Pruitt, Hesston, Kans.

[73] Assignee: Hesston Corporation, Hesston, Kans.

[21] Appl. No.: 752,122

[22] Filed: Jul. 5, 1985

[51] Int. Cl.⁴ .............................................. A01D 67/00
[52] U.S. Cl. ...................................... 56/208; 56/15.8; 56/15.2; 172/466
[58] Field of Search ................ 56/192, 208, DIG. 10, 56/15.2, 15.8, 15.9, 16.4, 10.4, 364, DIG. 1; 172/413, 466, 705

[56] References Cited

U.S. PATENT DOCUMENTS

| | | | |
|---|---|---|---|
| 4,073,345 | 2/1978 | Miller | 172/466 |
| 4,137,696 | 2/1979 | Webb | 56/208 |
| 4,177,625 | 12/1979 | Knight et al. | 56/15.8 |
| 4,182,099 | 1/1980 | Davis et al. | 56/16.4 |
| 4,270,338 | 6/1981 | Halls | 56/DIG. 1 |
| 4,585,211 | 4/1986 | Griffin | 172/705 |

Primary Examiner—Robert Peshock
Assistant Examiner—John G. Weiss
Attorney, Agent, or Firm—Schmidt, Johnson, Hovey & Williams

[57] ABSTRACT

In a harvester wherein the frame is raised relative to ground wheels for roading purposes and such elevation of the frame stretches flotation springs to thereby lift the harvesting header off the ground, the amount of flotation force exerted by the springs on the header can be quickly and easily adjusted by only partially raising the frame and then inserting mechanical stops which prevent retraction of hydraulic lifting cylinders when pressure is relieved therein. By inserting a variable number of such stops in a stack, the flotation force can likewise be adjustably varied.

13 Claims, 5 Drawing Figures

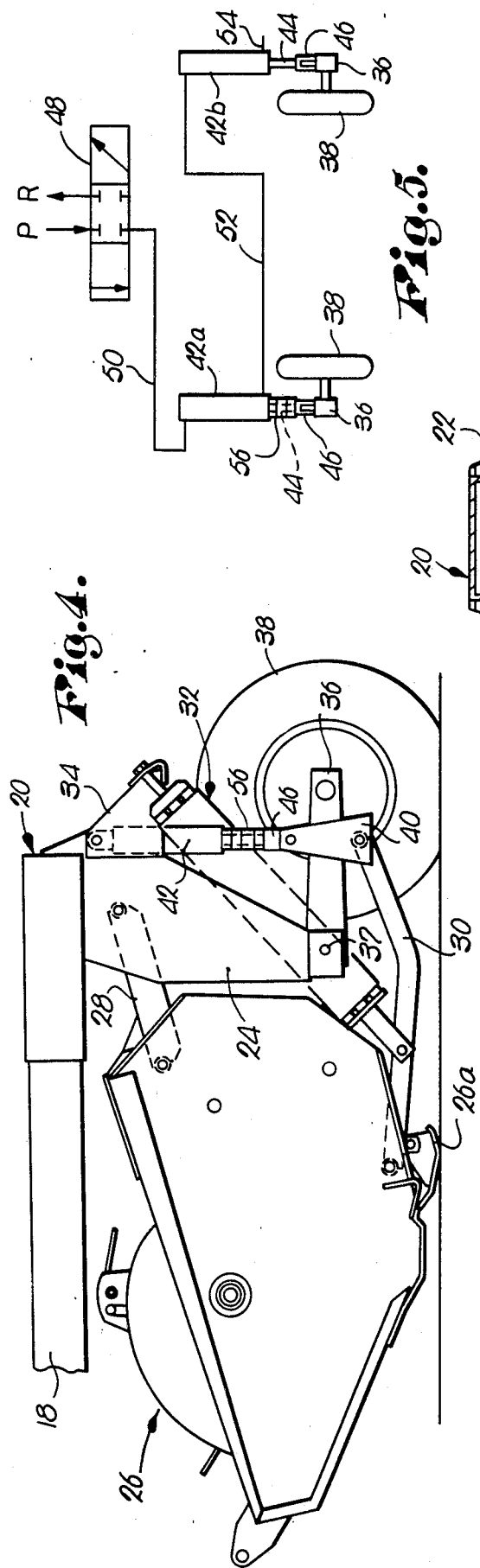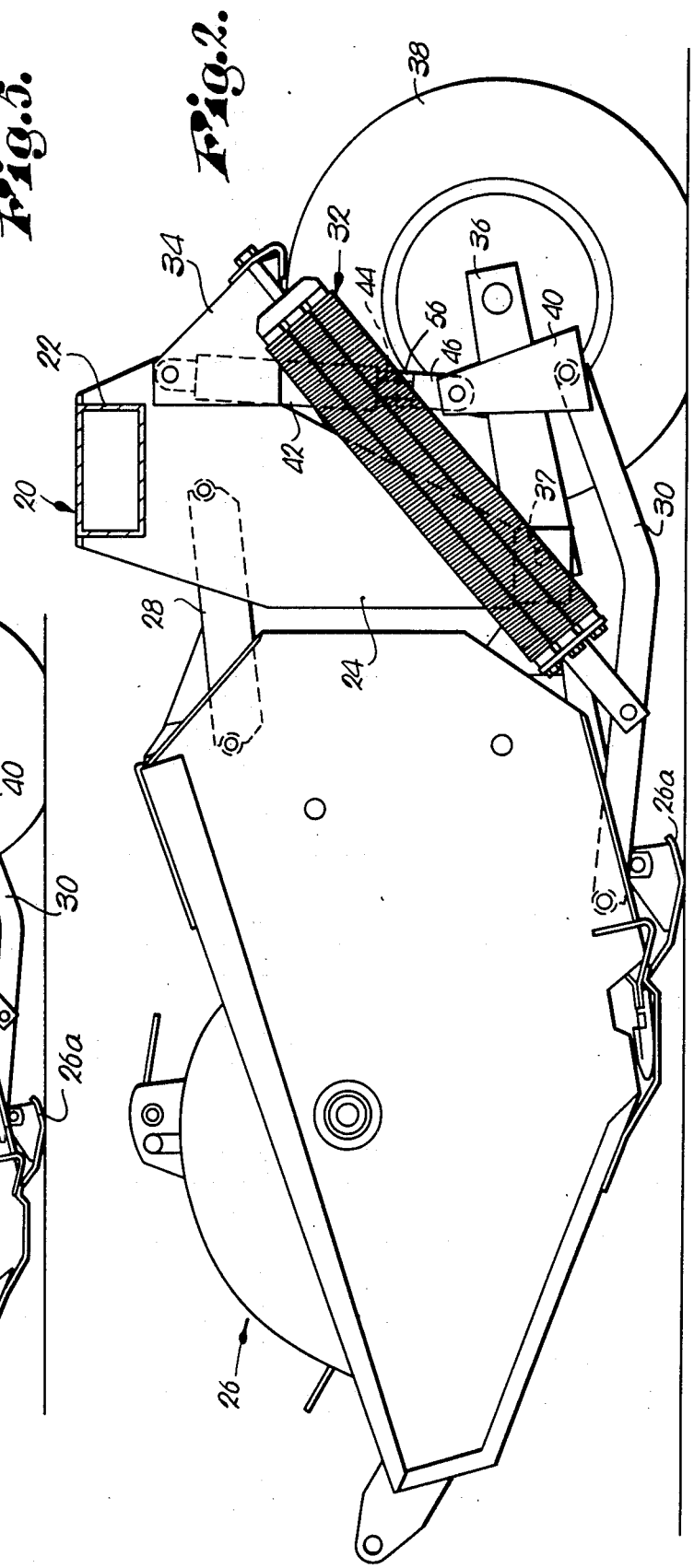

QUICK ADJUST FLOTATION APPARATUS FOR A CROP HARVESTER

BACKGROUND OF THE INVENTION

1. Technical Field

This invention relates to the field of crop harvesters and, more particularly, to the way in which the headers of such harvesters are floatingly supported for a relatively light, skimming engagement with the ground as the harvesters are advanced during operation.

2. BACKGROUND INFORMATION

In U.S. Pat. No. 3,832,837 in the name of Burkhart, et al., for example, tension springs are connected between the header and the frame of the machine to provide a measure of lifting force to the header which is less than that required to actually lift the header off the ground but which is adequate to effectively lighten the load which skid shoes of the header exert on the ground during advancement, thereby making it easier for the header to skim over rises and falls in the terrain as the harvesting operation is carried out. When it is desired to raise the header at the end of a crop row or to prepare it for over the road transport, hydraulic cylinders are extended to lift the header relative to the frame, allowing the flotation springs to become more relaxed in the process.

From time to time it may become necessary or desirable to adjust the flotation force provided by the springs. For example, there are times when the operator may want to change the cutting height of the header, which is normally accomplished by adjusting the skid shoes. However, such shift in header height also changes the flotation springs. If the operator desires to maintain the same flotation force as before, he must therefore also make an adjustment to the springs themselves in order to bring them back into the appropriate setting.

Sometimes, field conditions alone may dictate that flotation adjustments be made. For example, when moving from one field to another, the operator may discover a lighter load on the skid shoes is preferred due to rocky conditions or irregular terrain, thereby necessitating adjustment of the spring force.

The extent to which the flotation springs exert a lifting force on the header may be adjusted by applying a wrench to one or more adjusting bolts associated with each bank of tension springs at opposite ends of the header. This can, at times, be a rather tedious and time-consuming operation, and it is somewhat difficult to evenly balance the spring forces at opposite ends of the header so that one of the ends is not receiving a disproportionate amount of lift relative to the other.

Whereas harvesters of the type disclosed in the above-mentioned patent lift their headers by the direct action of hydraulic lift cylinders extending between the stationary machine frame and the header, other commercially available harvesters lift their headers by raising the frame to which the flotation springs are anchored, thus stretching the springs until such time as the weight of the header is completely carried by the springs, whereupon continued raising of the frame causes the header to be carried up by spring force with the rising frame. Adjustment of the flotation force of such springs to vary the extent to which the skid shoes of the header bear against the ground during harvesting operations is carried out in a manner similar to that discussed above with respect to the harvester of U.S. Pat. No. 3,832,837.

SUMMARY OF THE PRESENT INVENTION

An important object of the present invention is to provide a way of quickly and easily adjusting the header flotation force, when necessary or desirable due to changes in header cutting height or field conditions, in harvesters of the type wherein the header is suspended by spring force as it is raised and lowered between its upper and lower extreme positions.

In this respect, the present invention contemplates an arrangement wherein the wheel-supported main frame of the machine is raised by hydraulic cylinders when the machine is placed in condition for over the road travel. As such raising of the frame occurs, the flotation springs connected between the rising frame and the freely swingable header are progressively stretched, decreasing the load applied by skid shoes of the header against the ground and increasing the load borne by the ground wheels of the main frame. When the desired level of proportional load sharing by the ground wheels and skid shoes is reached, appropriate stops may be applied to the lift cylinders to prevent the frame from settling back down to its former height once hydraulic pressure in the system is removed, and by this process the flotation force on the header is quite quickly and easily adjusted without requiring the farmer to attempt manual adjustments to each of the springs.

BRIEF DESCRIPTION OF THE DRAWINGS

FIG. 2 is a fragmentary side elevational view thereof with the header flotation force set at one certain level;

FIG. 4 is a view similar to FIG. 2 on a reduced scale but illustrating the condition of things when the header flotation force is set at a second higher level of adjustment; and FIG. 5 is a diagrammatic view of the hydraulic circuit thereof.

DETAILED DESCRIPTION

Figure 1:
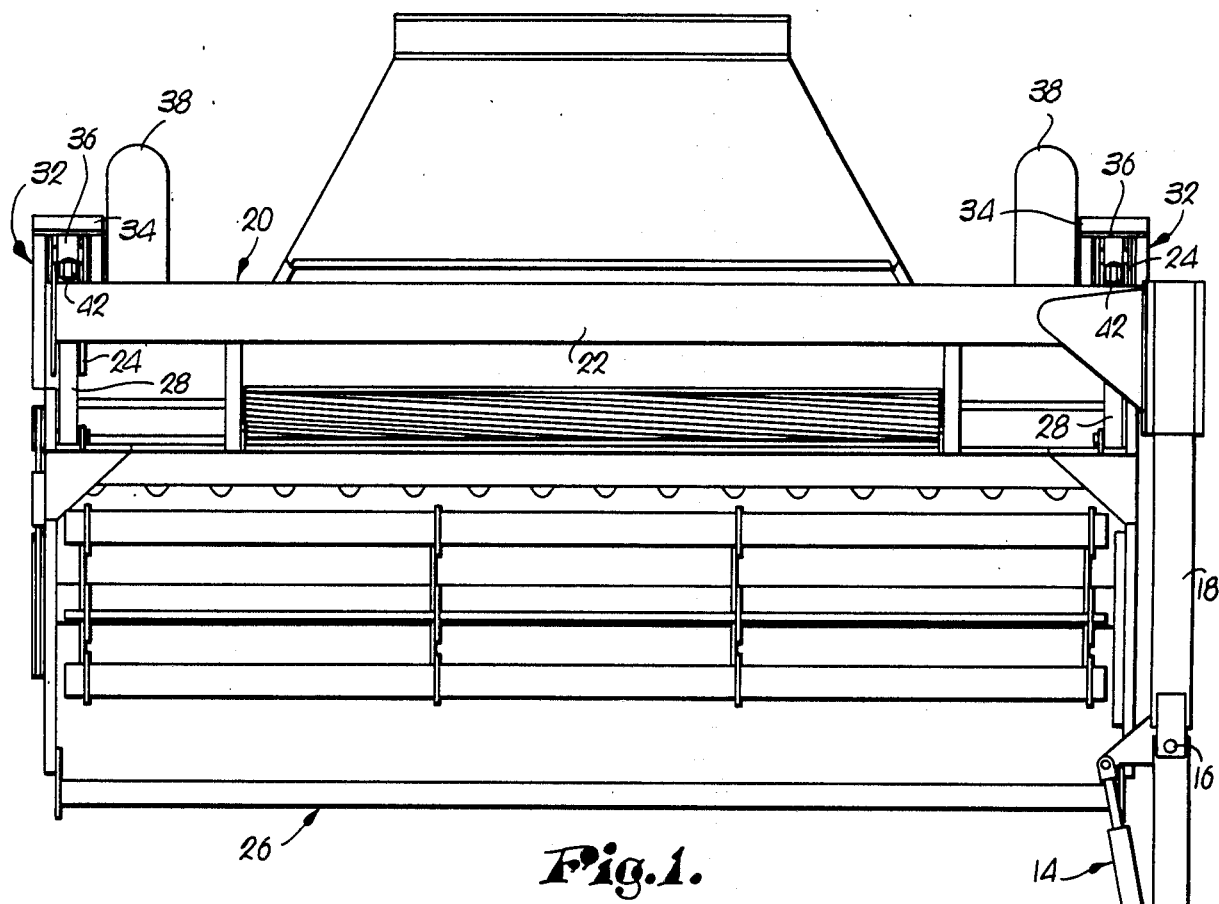
FIG. 1 is a top plan view of a crop harvester provided with quick adjust flotation apparatus made according to my present invention.
Figure 3:
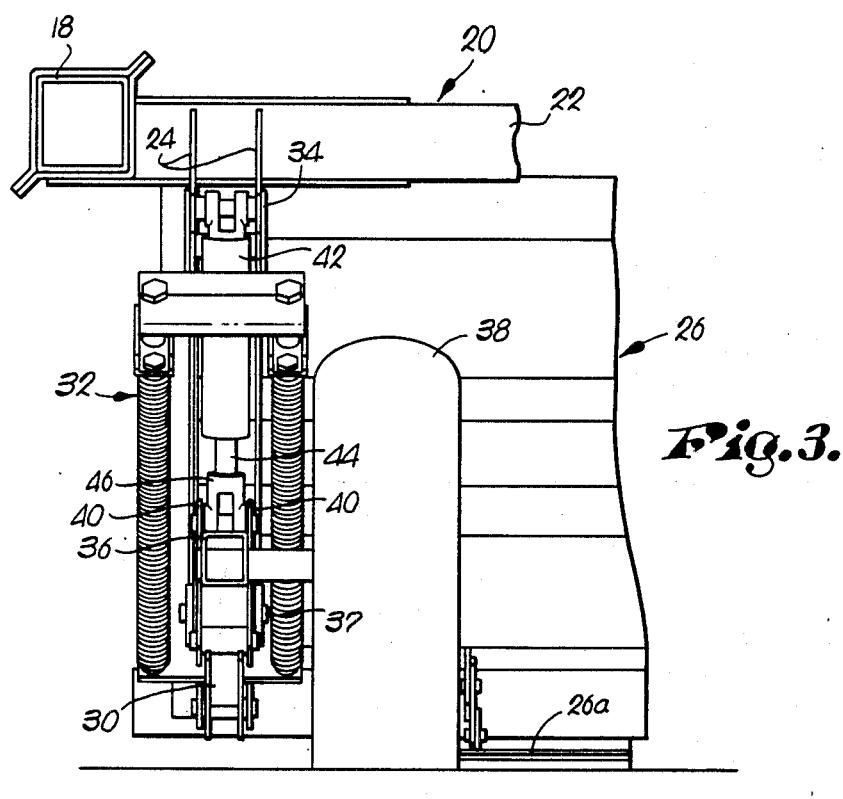
FIG. 3 is a fragmentary rear elevational view of one end thereof.

The agricultural harvesting implement shown in the drawings hereof is in the nature of a windrower having a tongue 10 provided with a tractor drawbar hitch 12, a hydraulic control 14 and a pivotal connection 16 with a forward extension 18 of an inverted, generally U-shaped frame 20. The frame 20 has a horizontal cross beam 22 and a pair of struts 24 rigid to and depending from the beam 22.

A header 26, disposed forwardly of the frame 20 and laterally of the extension 18, has four-point, header-supporting linkage secured thereto which includes a pair of upper links 28 and a pair of lower links 30, although a single, median, upper link may be substituted for the links 28, if desired, and each link 28 is pivotally secured to a corresponding strut 24 adjacent the upper end of the latter. Vertically adjustable ground skids 26a at opposite ends of header 26 ride along the ground. A bank 32 of pretensioned springs is pivotally attached at its lower end to each link 30 respectively and extends at an angle upwardly and rearwardly therefrom. A rearwardly extending support 34 for the upper ends of the spring banks 32 is rigidly secured to each strut 24 respectively adjacent the upper ends of the latter.

Each strut 24 has an elongated, swingable arm 36 pivotally secured thereto by a pivot 37 adjacent its lowermost end and extending rearwardly therefrom. Ground-engaging wheels 38 support the arms at their rearmost ends, and a bracket 40 is rigidly secured to each arm 36 respectively intermediate the ends thereof. Each link 30 is pivotally connected to a corresponding bracket 40 below the proximal arm 36.

A fluid pressure piston and cylinder assembly is provided for each arm 36 respectively, and each such assembly includes a cylinder 42 pivotally attached to the corresponding support 34, a reciprocable piston rod 44 projecting downwardly from the cylinder 42 and a head 46 on the rod pivotally secured to the corresponding bracket 40 above the arm 36.

With reference to FIG. 5, by use of a master-slave cylinder arrangement and manually controlled valving 48 having a reciprocable spool, hydraulic fluid under pressure from a suitable source (not shown) is directed along a line 50 to raise the first of the cylinders 42a, and the fluid exhausting therefrom is directed along a line 52 to raise the second of such cylinders 42b. A vent 54 directs the air exhausting from the second cylinder 42b into the atmosphere, although in place of the vent 54, a return hydraulic line (not shown) to valve 48 could be provided. While a master-slave circuit has been illustrated herein, it will be appreciated that other hydraulic arrangements could be utilized.

Quickly attachable and detachable stop collars 56 or other suitable blocking means encircle the rod 44 between the lower end of the cylinder 42a and the head 46 to limit the extent of retraction of the rod 44 into the cylinder 42a. Such collars 56 are well known in the art and may, for example, take the form of those offered for sale by Wadler Manufacturing Company of Galena, Kans. The number of such collars 56 provided in stacked relationship upon the rod 44 of the master cylinder 42a determines the flotation force exerted by the springs 32 as will now be explained.

OPERATION

It will be understood that as the rods 44 of the cylinders 42 are extended, the frame 20 is caused to rise, increasing the tension in the springs 32. Thus, the weight of the header 26 becomes progressively shifted off the skid shoes 26a of header 26 and onto the ground wheels 38 until such time as the weight of the header 26 is borne entirely by the ground wheels 38, whereupon continued elevation of the frame 20 causes the header 26 to be lifted off the ground completely.

If, instead of lifting the header 26 for transport it is only desired to adjust the flotation force exerted by the springs 32, the rods 44 are simply extended by that amount which causes the springs 32 to exert the desired lifting force. Then, it is a simple matter to slip the appropriate number of stop collars 56 in place, either on only the master cylinder 42a or both of the cylinders 42a and 42b as may be necessary or desirable, whereupon the harvesting operations may then be carried out with the newly selected flotation force. If less flotation is desired, it is simply necessary for the rods 44 to be extended adequately to remove the load on collars 56 and permit one or more of the same to be removed, whereupon the frame 20 may be lowered back down to the lower height such that an additional portion of the weight of the header 26 becomes borne by the skids 26a.

Adjustment to increase flotation force may be observed by comparing FIGS. 2 and 4. In this respect, it will be noted in FIG. 2 that a pair of stop collars 56 are illustrated between the lower end of the cylinder 42a and the upper end of the head 46. On the other hand, in FIG. 4, even though the header 26 remains on the ground, the frame 20 is raised relative to its condition in FIG. 2 and two additional stop collars 56 have been inserted between the lower end of the cylinder 42a and the upper end of the head 46.

It should be apparent from the foregoing, then, that a quick and easy way of adjusting the flotation force provided by the springs 32 to the header 26 has been disclosed. Yet, no sacrifice in the ability of the springs 32 to carry out their intended functions has been made, nor has any interference with the placement of the header 26 into its roading or transport position been caused.

What is claimed is:

1. An agricultural implement comprising:

a U-shaped frame having an elongated cross beam disposed transversely of the normal path of travel of the implement, and a pair of spaced struts rigidly secured to the beam, depending from the beam and terminating in lowermost ends;

a header disposed forwardly of the frame;

header-supporting linkage pivotally secured to the header, including upper link means and a pair of spaced lower links;

means pivotally securing said upper link means to the frame for up and down swinging movement relative to the latter and relative to the header;

yieldable means interposed between each lower link and its corresponding strut for exerting a lifting force on each of said lower links and for floatingly supporting the header;

a pair of elongated arms disposed below the beam and extending rearwardly from corresponding struts, each arm having a forwardmost and a rearmost end;

means for each arm respectively pivotally securing the same to its strut at said forwardmost and lowermost ends for up and down swinging movement relative to the struts;

a ground-engaging wheel for each arm respectively;

means for each arm respectively rotatably securing its wheel thereto at said rearmost end thereof;

means pivotally securing each lower link to a corresponding arm for up and down swinging movement relative to the latter and relative to the header; and flotation adjustment apparatus for adjusting the lifting force exerted by said yieldable means on the header, said apparatus having power means operated by fluid pressure for raising the frame relative to the wheels, said power means including extensible structure between the frame and each arm respectively for raising and lowering the frame, said apparatus further including means for selectively predetermining the extended position of said structure in any one of a number of positiions for holding said frame at a selected height and said yieldable means at a selected amount of lifting force on the header while relieving the fluid pressure of said power means.

2. The invention of claim 1; and a bracket secured to each arm respectively intermediate the ends thereof, said structures and said lower links being pivotally attached to corresponding brackets.

3. The invention of claim 2, said structures extending upwardly from the brackets and being pivotally attached to corresponding struts at the uppermost and rearmost extremities of the latter.

4. The invention of claim 3, the attachment of the lower links to the brackets being below the adjacent arms, the attachment of the structures to the brackets being above the adjacent arms.

5. The invention of claim 4, each structure being a fluid pressure piston and cylinder assembly.

6. The invention of claim 5, each assembly having a reciprocable piston rod extending outwardly from one end of the cylinder thereof, said selective means being collar means on the rods for limiting the extent of reciprocation thereof in one direction.

7. The invention of claim 6, said yieldable means being tensioned spring means above the brackets, extending upwardly and rearwardly at angle from intermediate the ends of the lower links to a zone disposed behind the struts.

8. The invention of claim 1, each structure being an upright fluid piston and cylinder assembly pivotally interconnecting each arm respectively and a corresponding strut at the uppermost and rearmost extremity of the latter.

9. The invention of claim 8, each assembly having a reciprocable piston rod extending downwardly from one end of the cylinder thereof, said selective means being collar means surrounding the rods for limiting the extent of downward movement of the cylinders.

10. The invention of claim 9, said yieldable means being tensioned spring means above the brackets, extending upwardly and rearwardly at angle from intermediate the ends of the lower links to a zone disposed behind the struts.

11. An agricultural implement comprising:
a frame;
ground wheels supporting the frame for travel across a field;
power means operated by fluid pressure for raising the frame relative to said wheels;
a harvesting header swingably coupled with said frame for up and down movement relative to the latter;
flotation spring means interconnecting said header and the frame whereby, as the power means is operated to raise the frame, said spring means exerts a progressively increasing amount of lifting force on the header; and
adjustable stop means operably associated with said power means for selectively holding said frame at a predetermined height and said spring means at a selected amount of lifting force on the header while relieving the fluid pressure of the power means.

12. An agricultural implement as claimed in claim 11, wherein said power means includes a fluid pressure-operated piston and cylinder assembly, said stop means comprising structure for mechanically blocking the extent of retraction of said assembly.

13. An agricultural implement as claimed in claim 12, wherein said structure includes a plurality of annular collars installable in selected numbers and in stacked relationship on the piston of said assembly exteriorly of the cylinder thereof.

* * * * *